United States Patent [19]

Ferronato

[11] Patent Number: 5,755,946

[45] Date of Patent: May 26, 1998

[54] ABRASIVE MEMBER FOR DRY GRINDING AND POLISHING

[76] Inventor: Sandro Giovanni Giuseppe Ferronato, Noorderkerkstraat 19, NL-8081 Et Elburg, Netherlands

[21] Appl. No.: 716,892

[22] Filed: Sep. 20, 1996

Related U.S. Application Data

[62] Division of Ser. No. 499,490, Jul. 7, 1995, Pat. No. 5,654,078.

[30] Foreign Application Priority Data

May 18, 1995 [EP] European Pat. Off. ............. 95201307

[51] Int. Cl.$^6$ ....................................................... B24D 3/10
[52] U.S. Cl. ........................ 205/110; 205/114; 205/122; 205/170; 205/210
[58] Field of Search ............................ 205/109, 110, 205/114, 122, 170, 210

[56] References Cited

U.S. PATENT DOCUMENTS

| | | | |
|---|---|---|---|
| 4,047,902 | 9/1977 | Wiand | 51/295 |
| 4,256,467 | 3/1981 | Gorsuch | 51/295 |
| 4,288,233 | 9/1981 | Wiand | 51/295 |
| 4,826,508 | 5/1989 | Schwartz et al. | 51/293 |
| 4,863,573 | 9/1989 | Moore et al. | 204/16 |
| 5,318,604 | 6/1994 | Gorsuch et al. | 51/293 |
| 5,328,716 | 7/1994 | Buchanan | 427/121 |
| 5,389,119 | 2/1995 | Ferronato et al. | 51/296 |

*Primary Examiner*—Kathryn L. Gorgos
*Assistant Examiner*—William T. Leader
*Attorney, Agent, or Firm*—Young & Thompson

[57] ABSTRACT

A flexible abrasive member comprising a first porous layer of mesh, non-woven or perforated sheet, conductive or non-conductive material to which on one side deposits are deposited by way of any metal plating technique of either the electrolytic, electroless or vacuum deposition type, or any galvanic process, abrasive particles being embedded in the metal deposits, a layer of filling material, such as a resin, being present between the deposits which filling material is bonded to said first porous layer and/or the deposits, and at least a second porous layer of mesh, non-woven or perforated sheet, conductive or non-conductive material being present and being laid substantially along one side of the first porous layer. The side edge of the deposit has at least one annular groove along at least part of the circumference of the deposit.

10 Claims, 1 Drawing Sheet

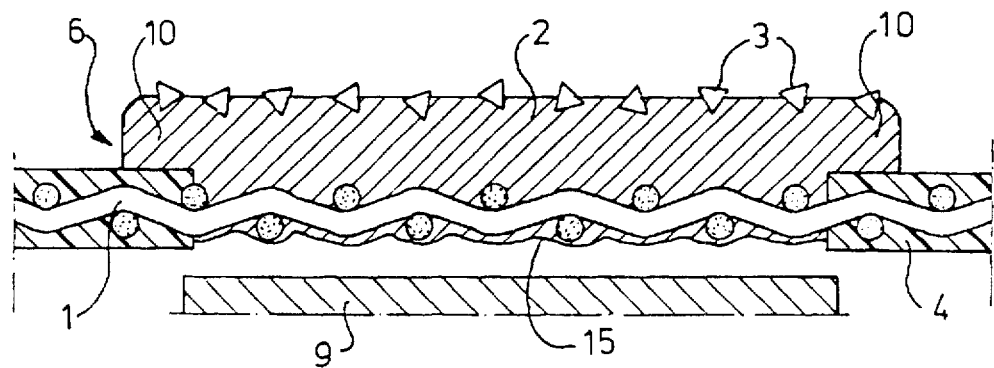
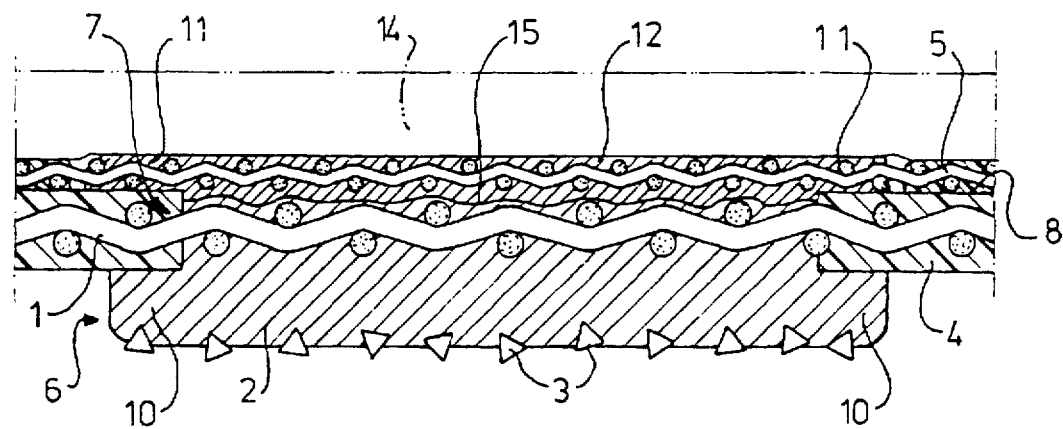
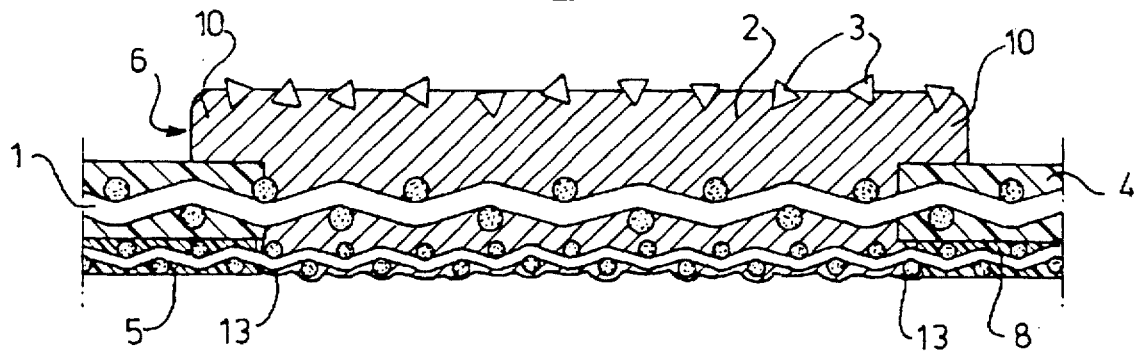

ABRASIVE MEMBER FOR DRY GRINDING AND POLISHING

This application is a division of application Ser. No. 08/499,490, filed Jul. 7, 1995, now U.S. Pat. No. 5,654,078.

FIELD OF THE INVENTION

The present invention relates to a flexible abrasive member comprising a first porous layer of, for example, mesh, non-woven or perforated sheet, conductive or non-conductive material to which at one side deposits are deposited by way of any metal plating technique of either the electrolytic, electroless or vacuum deposition type, or any galvanic process, abrasive particles being embedded in the metal deposits, a layer of filling material, such as a resin, being present between the deposits which filling material is bonded to said first porous layer and/or the deposits, and at least a second porous layer of, for example, mesh, non-woven or perforated sheet, conductive or nonconductive material being present and being laid substantially along one side of said first porous layer.

BACKGROUND OF THE INVENTION

Abrasive members for grinding and polishing are well known in the art. Two types of such abrasive members are known. Firstly the type for dry grinding and polishing comprising for example silicon carbide or aluminum oxide, having a short life time. Secondly the type for wet grinding and polishing comprising diamond particles as abrasive particles, which type may only be applied using a coolant, by example water. When this second type of abrasive member is used for dry grinding and polishing the life time is very short. In some applications it is desired to use an abrasive member with diamond particles when coolant may affect the product to be ground or polished or any object nearby, whereby using coolant is not allowed. At present there are no abrasive members well suited for these applications. The significant characteristic of an abrasive member is its resistant to wear due to thermal effects and mechanical effects.

In practice the problems to increase the life time of the abrasive member are that flexibility of the abrasive member must be maintained, that moldable materials having a high specific heat conductive capacity are known to have generally bad characteristics concerning resistance to wear due to mechanical effects, that a very strong bonding between all materials in the composition of the abrasive member, in particular between the abrasive particles and the backing material of the abrasive member, must be achieved, and that it must be possible to produce this composition easily and with low production cost.

OBJECT OF THE INVENTION

The object of the invention is to provide a flexible abrasive member with diamond particles for dry grinding and polising with a high mechanical and thermal resistance to wear so that a much longer lifetime is achieved than can be achieved by the conventional flexible, diamond abrasive members.

SUMMARY OF THE INVENTION

This object of the invention is achieved by the side edge of the deposit having at least one annular groove along at least part of the circumference of the deposit. The layer of filling material may extend substantially into and at least along part of this annular groove. Hereby part of said layer is encapsulated by the groove thus increasing resistance to mechanical wear and tear. The abrasive member is reinforced by the second porous layer whereby its mechanical resistance is increased, while its flexibility is maintained. Moreover its thermal resistance is increased for the amount of heat conducting material is increased by applying the other layer.

According to another aspect of the invention the annular groove is achieved by any metal plating technique of either the electrolytic, electroless or vacuum deposition type, or any galvanic process. Generally a groove may be achieved by known methods. Obviously a groove per deposit in the side edge of a deposit having micro to milli dimensions, while hundreds to thousands of deposits are present per abrasive member, is hard to achieve. By the method according to the present invention such a groove is easily achieved using the same technique that creates the deposit itself.

According to another aspect of the invention the layer of filling material consists of material having a heat resistant point substantially less than or about 200° C. Herein the heat resistant point is the temperature above which the material fails, i.e. melts and thereby deforms and affects the abrasive member in its functioning. Material having a higher heat resistant point is a much more complex type of material and in practice is much more expensive than a material having a heat resistant point. The filling material may be polyurethane, acrylicacetate or epoxy resin.

According to another aspect of the invention a following porous layer at least partially is interwoven or spot welded with at least one of the preceding porous layers. The present invention can be practiced when either two or more porous layers are laid on top of each other or two or more porous layers are interconnected to each other, for example by being interwoven or spot welded with each other. Just the presence of two or more layers or interstices between two or more mesh, non-woven or perforated sheet materials is important so as to enable the deposition of a deposit having an annular groove, which groove is for example achieved by embedding these two or more layers in the deposit. At least the second porous layer may at least partially be interwoven or spot welded with the first porous layer.

According to another aspect of the invention the first porous layer with low mesh count or open structure faces the anode and the second porous layer with high mesh count or dense structure faces the cathode. Hereby electrodeposition of metal onto both layers is improved because the straight line between anode and cathode is less or hardly interferred with by any object, while a greater surface of the cathode is exposed to the electrodeposition bath.

According to another aspect of the invention the mesh count of the second porous layer is 2.5 to 6 times less than the mesh count of the first porous layer. In practice this range gives the best results.

According to another aspect of the invention a layer of any resin material, such as any glue material, extends along one side of the first porous layer and substantially between all deposits. This resin material may be used for filling the remaining space between deposit, layer of filling material and the second porous layer, thus reinforcing the abrasive member and thus increasing the resistance to wear. Moreover, the glue material may be used to attach the abrasive member to the backing layer mentioned above, thus also increasing the resistance to wear. Herein the layer of resin material embeds at least part of the second porous layer thus causing a better bonding effect. This layer of resin material may be bonded to the second porous layer and/or the layer of filling material and/or the deposits.

In general terms, the object of the present invention is achieved by enlarging the heat conductive capacity of the abrasive member and reinforcing the bonding of the several materials to each other.

The heat conductive capacity is enlarged firstly by increasing the mass of the abrasive member without loosing the flexibility required and secondly by using filling material with a higher specific heat conductive capacity, which material has not yet been used in long life time abrasive members for dry grinding or polishing, because of its really bad bonding characteristics.

Increasing the mass of the abrasive member is achieved basically by applying more material. Increasing the mass of the abrasive member increases the amount of heat leaking away per time unit so that more heat may be fed to the abrasive member by dry grinding or polishing on the spot. It is important not to lose any flexibility of the abrasive member so a flexible filling material is applied just as is in the well known abrasive members.

Using filling material with a higher specific heat conductive capacity, naturally increases the amount of heat leaking away per time unit or being absorbed. A larger heat conductive capacity increases the resistance to wear of the abrasive member.

The bonding of the several materials to each other is reinforced firstly by providing a deposit with a substantially U-shaped side profile in sectional view, secondly by providing a second porous layer of, for example, mesh, non-woven or perforated sheet material along the first porous layer of, for example, mesh, non-woven or perforated sheet material, which second porous layer has a lower mesh count or a more open structure than the first porous layer, and thirdly by applying glue to the portions where no deposits are present in the second porous layer.

The substantially U-shaped side profile in sectional view of the deposit encapsulates part of the filling material applied to the portions of the first porous layer where no deposits are present. Hereby a mechanical enclosure is achieved rather than a chemical bonding of the filling material to the deposit material, which mechanical enclosure has a higher resistance to wear than this chemical bonding.

The second porous layer laid on the well known first porous layer provides per deposit a larger surface for attaching the deposit material. Moreover, tearing of the abrasive member is rendered more difficult because more attachements per deposit have to be torn while naturally tearing two layers of, for example, mesh, non-woven or perforated sheet materials at one time is more difficult than tearing only one such layer.

The mesh count or density of the second porous layer of, for example, mesh, non-woven or perforated sheet material is less than that of the first porous layer for convenience of depositing in a galvanic process. Any relation may be provided between the grade of the first relative to the second porous layer, although in practice the best results have been achieved using a relation not equal to one, in particular greater than one. The better the depositing takes place the more the mechanical resistance to wear of the abrasive member is increased.

Applying glue to the portions where no deposits are present in the second porous layer reinforces chemically the bonding between filling material, deposit and both porous layers, while the flexibility of the abrasive member is not decreased. Hereby the resistance to mechanically caused wear of the abrasive member is increased.

When one of the porous layers is made of conductive material, this layer itself may form the cathode in the electrolytic process. Thereby a separate cathode may be omitted. This layer will then be indicated as being a 'permanent cathode'.

Several methods of making abrasive members are well known in the art. The methods known, are not suited for making the abrasive member of the present invention because no annular groove in the side edge of the deposits may be achieved by way of any metal plating technique known of either the electrolytic, electroless or vacuum deposition type, or any galvanic process.

One method for producing a flexible abrasive member according to the present invention comprises the steps of applying said first porous layer of, for example, mesh, non-woven or perforated sheet, conductive or non-conductive material with electrically insulating material, i.e. said layer of filling material, over selected areas so that the metal layer is deposited only over the remaining non-covered discrete areas of the surface of said first porous layer, connecting said first porous layer to a cathode, by example a metal face which forms the cathode in the electrolytic process, electrolytically depositing metal through the pores or interstices of said first porous layer causing a firm bond between the metal deposits thus built up and the first porous layer preferably in the presence of abrasive material, continuing the electrolytical deposition until metal has been deposited beyond the height of the layer of filling material above the top surface of the cathode, causing the creation of a radially extending annular rim, turning the first porous layer including the layer of filling material and the deposits up side down the deposits created now forming the cathode in the electrolytic process, laying a second porous layer of, by example, mesh, non-woven or perforated sheet, conductive or nonconductive material onto the free surface of the first porous layer, restarting the electrolytic process causing metal to be deposited through the pores or interstices of the second porous layer embedding at least part of the second porous layer by creating relative to a deposit created earlier a radially extending annular rim. By this method an abrasive member is achieved having an annular groove along the circumference of the deposit. This groove is substantially filled with material of the layer of filling material so that this layer is encapsulated by the groove. Hereby a mechanical enclosure is achieved, which causes a high resistance to wear.

To improve the high resistance to mechanical wear of the first method mentioned above, another method comprises the step of putting the member created into a reactivation bath before the step (see method mentioned above) of laying the second porous layer onto the free surface of the first porous layer, for working the surfaces of the deposits created, which surfaces lie on the surface of the so as to prepare said surfaces for extended metal deposition onto these surfaces. Working the surfaces of the deposits affects the surface structure of the deposit already formed whereby a much better coalescence between the extended metal deposit and said surface structure is achieved.

Another method comprises the steps of applying the first porous layer with the second porous layer, laying both the first and the second porous layer as one composition onto a metal face, which forms the cathode in the electrolytic process, applying said composition of layers with electrically insulating material, i.e. said layer of filling material, over selected areas so that the metal layer is deposited only over the remaining non-covered discrete areas of the surface of the composition of layers, electrolytically depositing metal through the pores or interstices of the layers of the composition causing a firm bond between the metal deposits thus built up and the porous layers preferably in the presence of abrasive material, continuing the electrolytical deposition until metal has been deposited beyond the height of the layer of filling material above the top surface of the cathode, causing the creation of a radially extending annular rim. This method based upon the same idea of the two methods mentioned above is easier to perform than those two methods, but a less clear groove is achieved. Nevertheless, this method provides a good compromise for ease of production, and thereby cost of production, and resistance to mechanical tear.

The composition of layers may be formed by two or more at least partially interwoven or spot welded porous layers of, by example, mesh, non-woven or perforated sheet material, whereby in the preceding method the first step of applying the first porous layer with the second porous layer may be omitted or this first porous layer may be formed by said composition of layers. As was mentioned above the present invention can be practiced when either two or more porous layers are laid on top of each other or two or more porous layers are interconnected to each other, for example by being interwoven or spot welded with each other. When using a material consisting of two or more interwoven or spot welded layers of porous material the present invention may be produced by using an even easier method.

According to another aspect of the invention at least one side of the member created may be applied with a layer of resin, such as a glue material, for example epoxy, polyester or polyurethane. Hereby the member may be attached to a backing layer thereby reinforcing the abrasive member and causing higher resistance to wear due to mechanical or thermal influences.

According to another aspect of the invention the electrically insulating material, i.e. said layer of filling material, may be applied by way of producing of a printing image including the steps of applying a photographic resist onto the surface of the first porous layer, exposing the resist to a film having the desired copy, development of the image thereby leaving a resist pattern, and etching of the surface to remove the resist material around the resist pattern thereby opening the first porous layer where the resist material is removed to define an etched image on the surface. Although this method is well known in screen printing techniques, and in providing a mask as part of a metal deposition process, it has not yet been used to provide the filling layer. The possibility to use a filling material having a much lower heat resistance enables the use of less complex material whereby screen print techniques may be employed.

According to another aspect of the invention the second porous layer is an electrically conductive material. Hereby metal is deposited onto sections of this second porous layer also resulting in better bonding by embedding whereby the resistance to mechanical wear is increased.

According to another aspect of the invention one side of the member created is applied with a backing layer, the bonding between said backing layer and the member created being achieved by the layer of glue material being applied earlier. As was mentioned before, a backing layer may reinforce the abrasive member and thus causes higher resistance to wear due to mechanical or thermal influences.

BRIEF DESCRIPTION OF THE DRAWINGS

The invention will be further elucidated referring to two embodiments of the invention shown in the drawing, wherein:

FIG. 1 shows the result of the first four steps of one method for producing a flexible abrasive member according to the present invention;

FIG. 2 shows the result of the rest of the steps of the first method and;

FIG. 3 shows the result of the steps of another method for producing a flexible abrasive member according to the present invention.

In FIG. 1 a first embodiment of the abrasive member according to the invention is shown. The flexible abrasive member comprises a first porous layer 1 of, for example, mesh, non-woven or perforated sheet material to which on one side deposits 2 are deposited by way of any metal plating technique of either the electrolytic, electroless or vacuum deposition type, or any galvanic process, abrasive particles 3 being embedded in the metal deposits 2, and a layer 4 of filling material, such as a resin, being present between the deposits 2, which filling material 4 is bonded to the first porous layer 1 and/or the deposits 2. The flexible abrasive member is made by firstly laying the first porous layer 1 onto a metal surface 9, which forms the cathode in the electrolytic process. Secondly the first porous layer 1 is applied with electrically insulating material, i.e. the layer 4 of filling material, over selected areas so that the metal layer is deposited only over the remaining non-covered discrete areas of the surface of the first porous layer. Thirdly metal 2 is electrolytically deposited through the pores or interstices of the first porous layer 1 causing a firm bond between the metal deposits 2 thus built up and the first porous layer 1. Preferably this is done in the presence of abrasive material 3 so that this material becomes imbedded in the deposits. Further the electrolytical deposition is continued until metal has been deposited beyond the height of the layer 4 of filling material above the top surface of the cathode 9, causing the creation of a radially extending annular rim 10. Then the member thus created, including the first porous layer 1, the layer 4 of filling material and the deposits 2, is taken off the surface 9 and is turned up side down for continuation of the production process.

In FIG. 2 the result of the extended metal electrodeposition to the abrasive member according to FIG. 1 is shown. Said production process is continued wherein the member turned up side down now forms the cathode in the electrolytic process. The following steps of the method are firstly laying a second porous layer 5 of, by example, mesh, non-woven or perforated sheet material onto the free surface of the first porous layer 1 and secondly restarting the electrolytic process causing metal 12 to be deposited through the pores or interstices of said second porous layer 5 embedding at least part of said second porous layer 5 by creating relative to a deposit 2 created earlier a radially extending annular rim 11. Finally the abrasive member comprises a second porous layer 5 of mesh or non-woven conductive or non-conductive material laid substantially along one side of said first porous layer 1.

As can be seen from FIGS. 2 and 3 the mesh count of the second porous layer 5 is higher than the mesh count of the first porous layer 1.

By the invention, in the side edge 6 of the deposit 2 at least one annular groove 7 along at least part of the circumference of the deposit 2 has been formed. The layer 4 of filling material extends substantially into and at least along part of this annular groove 7. The layer 4 of filling material extends substantially between all deposits 2, and a layer 8 of a glue material, extends along one side of the first porous layer 1 and substantially between all deposits 2. A backing layer 14 is attached via the glue layer 8 to the abrasive member. The layer 8 embeds at least part of said second porous layer 5.

After turning the abrasive member created so as to continue metal electrodeposition a dividing line 15 is formed between the deposit 2 which has been created already and the extended deposit 12 which now has to be created. To improve the high resistance to mechanical wear the member created may be put into a reactivation bath before the step of laying the second porous layer 5 onto the free surface of the first porous layer 1, for working the surfaces of the deposits created. This is done to affect the surface structure of the deposits 2 already formed whereby a much better coalescence between the extended metal deposit 12 and the surface structure 2 is achieved.

In FIG. 3 another embodiment of the abrasive member according to the invention is shown. The flexible abrasive member comprises a first porous layer 1 to which on one side deposits 2 are deposited by way of any metal plating technique of either the electrolytic, electroless or vacuum deposition type, or any galvanic process, abrasive particles 3 being embedded in the metal deposits 2, and a layer 4 of filling material, such as a resin, being present between the deposits 2, which filling material 4 is bonded to the first porous layer 1 and/or the deposits 2. Further the abrasive member comprises a second porous layer 5 of mesh or non-woven conductive or non-conductive material laid substantially along one side of said first porous layer 1, and a layer 8 of a glue material, extending along one side of the first porous layer 1 and substantially between all deposits 2 embedding at least part of the second porous layer 5.

This flexible abrasive member is made by firstly applying to the first porous layer 1 the second porous layer 5. Secondly both said first 1 and said second porous layer 5 are laid as one composition onto a metal surface 9, which forms the cathode in the electrolytic process. Thirdly this composition of layers is covered with electrically insulating material, i.e. the layer 4 of filling material, over selected areas so that the metal layer 2 is deposited only over the remaining non-covered discrete areas of the surface of the composition of layers. Further metal is electrolytically deposited through the pores or interstices of the layers of the composition causing a firm bond between the metal deposits 2 thus built up and the porous layers. Preferably this is done in the presence of abrasive material 3 so that this material 3 becomes embedded in the deposits 2. Finally electrolytical deposition is continued until metal 2 has been deposited beyond the height of the layer 4 of filling material above the top surface of said cathode (not shown), causing the creation of a radially extending annular rim 10.

By way of this method, in the side edge 6 of the deposit 2 an annular groove 7 along at least part of the circumference of the deposit 2 has been formed. Relative to the groove 7 in the deposits according to FIG. 2 now a less clear groove 7 is achieved, mainly because rim 13 is quite a bit smaller than rim 11. Nevertheless the layer 4 of filling material extends substantially into and at least along part of this annular groove 7 thus being encapsulated by the rims 10 and 13 and the deposit 2. The layer 4 of filling material extends substantially between all deposits 2, and a layer 8 of a glue material, extends along one side of the first porous layer 1 and substantially between all deposits 2.

I claim:

1. A method of making a flexible abrasive member comprising the steps of:

applying electrically insulating material to selected areas of a first side of a first porous layer;

connecting the first porous layer to a cathode in an electrolytic deposition process;

electrolytically depositing a first layer of metal onto the first side of the first porous layer between the selected areas and onto an edge of the insulating material adjacent the selected areas until the metal is deposited to a height that exceeds a height of the insulating material to bond the first deposited metal layer to the first porous layer and to form a first metal rim on the edge of the insulating material, an abrasive material being added to the deposited metal;

inverting the first porous layer so that the deposited metal is a cathode in the electrolytic deposition process;

laying a second porous layer on a second side of the first porous layer opposite the first side; and electrolytically depositing a second layer of metal onto the second porous layer and onto the edge of the insulating material to bond the second deposited metal layer to the second porous layer and to form a second metal rim opposite the first metal rim that, with the first metal rim, sandwiches the edge of the insulating material.

2. The method according to claim 1, before the step of laying the second porous layer, further comprising the step of placing the first porous layer with the first layer of metal deposited thereon into a reactivation bath to prepare for the deposition of the second layer of metal.

3. The method according to claim 1, further comprising the step of applying a layer of resin to the flexible abrasive member.

4. The method according to claim 3, wherein the resin is a glue, and further comprising the step of applying a backing layer to the glue.

5. The method according to claim 1, wherein the step of applying the electrically insulating material comprises the steps of applying a photographic resist to the first side of the first porous layer, exposing the resist to a film with the selected areas, developing an image formed in the resist to form a resist pattern, and etching the resist pattern to expose the first porous layer.

6. The method according to claim 1, wherein the second porous layer is an electrically conductive material.

7. A method of making a flexible abrasive member comprising the steps of:

bringing together a first porous layer and a second porous layer;

connecting one of the first and second porous layers to a cathode in an electrolytic deposition process;

applying electrically insulating material to selected areas of the joined first and second porous layers; and electrolytically depositing a layer of metal onto one of the first and second porous layers between the selected areas and onto a first side of an edge of the insulating material adjacent the selected areas until the metal is deposited to a height that exceeds a height of the insulating material to bond the first deposited metal layer to the first and second porous layers and to form a first metal rim on the first edge of the insulating material, an abrasive material being added to the deposited metal.

8. The method of claim 7, wherein the step of bringing together the first and second porous layers comprises the step of interweaving at least two porous layers.

9. The method of claim 7, wherein the step of bringing together the first and second porous layers comprises the step of spot welding at least two porous layers.

10. The method of claim 7, wherein during the step of depositing the layer of metal, the metal extends over a second side of the edge of the insulating material to form a second metal rim opposite the first metal rim that, with the first metal rim, sandwiches the edge of the insulating material.

* * * * *

UNITED STATES PATENT AND TRADEMARK OFFICE
CERTIFICATE OF CORRECTION

PATENT NO. : 5,755,946
DATED : May 26, 1998
INVENTOR(S) : Sandro Giovanni Giuseppe FERRONATO It is certified that error appears in the above-indentified patent and that said Letters Patent is hereby corrected as shown below:

On the title page, Item [54], and column 1, line 1.

--METHOD OF MAKING AN ABRASIVE MEMBER FOR DRY GRINDING AND POLISHING--.

Signed and Sealed this

Fourth Day of August, 1998

Attest:

BRUCE LEHMAN

*Attesting Officer*       *Commissioner of Patents and Trademarks*